(12) United States Patent
Ramu

(10) Patent No.: US 7,134,396 B2
(45) Date of Patent: Nov. 14, 2006

(54) SYSTEM TO GENERATE AND CONTROL LEVITATION, PROPULSION AND GUIDANCE OF LINEAR SWITCHED RELUCTANCE MACHINES

(75) Inventor: Krishnan Ramu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 109 days.

(21) Appl. No.: 10/728,344

(22) Filed: Dec. 2, 2003

(65) Prior Publication Data

US 2005/0115454 A1 Jun. 2, 2005

(51) Int. Cl.
*B61C 3/00* (2006.01)

(52) U.S. Cl. .................... 105/49; 105/48; 318/696; 318/701; 104/282

(58) Field of Classification Search .............. 318/696, 318/701, 254, 135; 104/282, 148, 290, 291, 104/292; 105/48, 49; 198/334, 805, 370.04
See application file for complete search history.

(56) References Cited

U.S. PATENT DOCUMENTS

| | | | | |
|---|---|---|---|---|
| 3,171,046 A | * | 2/1965 | Jarret et al. ............... | 310/168 |
| 3,225,228 A | * | 12/1965 | Roshala ..................... | 310/12 |
| 3,706,922 A | * | 12/1972 | Inagaki ..................... | 318/135 |
| 3,707,924 A | * | 1/1973 | Barthalon et al. .......... | 104/290 |
| 3,904,941 A | * | 9/1975 | Matsui et al. .............. | 318/135 |
| 3,934,183 A | * | 1/1976 | Saufferer .................... | 318/135 |
| 4,313,135 A | * | 1/1982 | Cooper ..................... | 348/512 |
| 4,896,089 A | * | 1/1990 | Kliman et al. ............. | 318/701 |
| 4,943,760 A | * | 7/1990 | Byrne et al. ................ | 318/701 |
| 5,315,224 A | * | 5/1994 | Zellman ..................... | 318/701 |
| 5,772,326 A | | 6/1998 | Post | |
| 5,936,373 A | * | 8/1999 | Li et al. ..................... | 318/701 |
| 6,250,230 B1 | | 6/2001 | Post | |
| 6,439,513 B1 | | 8/2002 | Pascoe | |

\* cited by examiner

*Primary Examiner*—Frantz F. Jules
(74) *Attorney, Agent, or Firm*—Melvin K. Silverman; Yi Li

(57) ABSTRACT

A translation system, applicable in trains, elevators, aircraft launchers, rail guns, conveyors, door openers, machine tools and servo drives, includes a first linear switch reluctance machine ("LSRM") having a stator and a translator each configured, positioned and proportioned for electromagentic engagement with the other. The system further includes an assembly for selectable application of at least one phase of a multiphasic DC excitation to the LSRM to produce a longitudinal or propulsive force between the stator and translator. The system further includes an assembly for the substantially simultaneous application of at least two phases of the DC excitation to the LSRM to produce a continual normal force between the stator and translator. A second LSRM may be provided, positioned in quadrature to the first LSRM, and in electromagetic engagement with it. A multiphasic excitation of a stator and translator of the second LSRM produces both a guidance force for the first LSRM using error values generated by it and an additional propulsive force. Independent control of the phasic excitations for each of said propulsive, lift, and guidance forces may be provided.

14 Claims, 7 Drawing Sheets ooo : Without normal force contribution from propulsion phase B
*** : With normal force contribution from propulsion phase B

US 7,134,396 B2

SYSTEM TO GENERATE AND CONTROL LEVITATION, PROPULSION AND GUIDANCE OF LINEAR SWITCHED RELUCTANCE MACHINES

REFERENCE TO RELATED APPLICATION

This application claims the priority under 35 U.S.C. 371 of PCT Application No. PCT/US02/18033, filed 06 Jun. 2002 which claims the benefit under 35 U.S.C. 119(e) of U.S. Provisional Application No. 60/296,150, filed 07 Jun. 2001, and incorporates the same by reference hereinto.

BACKGROUND OF THE INVENTION

1. Field of the Invention

The present invention relates to the control of switched reluctance machines and, particularly, those machines which are used as a prime mover in a translation system including transport systems.

2. Description of Related Art

The present invention relates generally to transportation systems utilizing electromagnetic propulsion, and more particularly to a transportation system utilizing linear switched reluctance propulsion.

As world population rises and urban areas become increasingly congested, the need for fast, reliable, energy-efficient and environmentally-friendly mass transportation becomes ever more urgent.

Transportation using electromagnetic propulsion is known. For example, magnetic levitation (mag-lev) systems are used in trains and similar forms of transportation. Benefits offered by mag-lev include a smooth, quiet ride at high speeds, with little mechanical wear on supporting infrastructure, since the systems are contactless and therefore frictionless. Mag-lev also tends to be energy-efficient and having a smaller environmental impact than conventional rail systems, due in part to the fact that pollutants are not generated.

However, drawbacks exist with known mag-lev systems. For example, separate electromagnetic arrangements are used for lift and propulsion. That is, known mag-lev systems typically employ a combination of superconducting magnets, permanent magnets or more conventional electromagnets for lift, along with linear induction or synchronous motors for propulsion. This tends to compound construction and manufacturing problems, create additional problems of reliability in regard to cooling requirements for the superconducting magnets, temperature sensitivity and demagnetization possibilities for the permanent magnets under fault conditions, and total reliance on electromagnets leading to heavy sets of electromagnets and additional costs.

Further, induction or synchronous motors used for propulsion typically utilize complex distributed windings that are spread over the guideways or tracks for mag-lev vehicles. Such distributed windings tend to have high manufacturing costs and installation requirements and costs. Moreover, since components faults in one part of the windings are propagated along extended sections of the guideways or tracks by mutual coupling with other windings, such machines are not fault-tolerant and hence unreliable for continuous operation under all conditions including that of the fault condition. Since the windings are along the track or guideway it can be difficult to locate and repair or replace failing winding components without disrupting the flow of traffic on the guideway. In order to replace the failed component, a whole section of the phase belt for all phases must be dug out and replaced. Such a whole section may be as long as a few feet to a hundred feet in a mag-lev transportation system.

In view of the foregoing considerations, improvement in electromagnetic propulsion technologies and transportation systems is called for.

This invention is, more particularly, an improvement with respect to the control system of the invention set forth in PCT Application No. PCT/US01/15208 and having International Publication No. WO 01/87663 82, published 22 Nov. 2002, of which I am a co-inventor.

The instant invention may also be viewed with respect to the broader technology of linear switched reluctance machines ("LSRM") as employed in transportation and other translational means. Such art is reflected in U.S. Pat. No. 3,934,183 (1976) to Saufferer, entitled Linear Reluctance Motor for Rail Propulsion; U.S. Pat. No. 5,343,811 (1994) to Schuster entitled Power System for Low Friction Transportation of loads; U.S. Pat. No. 5,479,145 (1995) to Kalsi, entitled Superconducting Electromagnetic for Levitation and Propulsion of a Mag Lev Vehicle; U.S. Pat. No. 6,044,770 (2000) to Davey et al, entitled Integrated High Speed Maglev System; U.S. Pat. No. 6,439,513 (2002) to Pascoe, entitled Passive Detection System for Levitated Vehicle or Levitated Vehicle System; U.S. Pat. No. 5,722,326 (1998) to Post, entitled Magnetic Levitation System for Moving Objects; and U.S. Pat. No. 6,250,230 (2001) to Post, entitled Apparatus and Method for Reducing Inductive Coupling Between Levitation and Drive Coils within a Magnetic Propulsion System. Related foreign art includes German Patent No. 22-57-773-A (1974) to Weh. As such, mag-lev transportation and translation systems, including the above-referenced type which suggests the use of superconducting electromagnets have, in view of the considerations above set forth, proven to be less than satisfactory in terms of the technical and economic realities thereof.

A fundamental problem associated with mag-lev systems has been that of optimizing the switching and control systems associated therewith. U.S. Pat. No. 5,936,373 (1999) to Li et al, entitled Wide Pole Switched Reluctance Machine and Method of its Control; and U.S. Pat. No. 6,291,949 B1 (2001) to Greene, entitled Control of Switched Reluctance Machine, both suggest the use of polyphase switched control, however relative to a rotary, not linear, reluctance systems and, as such, are not applicable to translation systems that are the focus of the present invention.

SUMMARY OF THE INVENTION

According to the embodiments of the invention, there is provided a multiphase translation and transportation system utilizing LSRMs which comprises a stator and a translator configured in electromagnetic engagement with each other, and force-generating means for application to each of said translator and stator to generate a propulsive force in combination with a normal force acting in a direction substantially perpendicular to the propulsive force. Thus, a propulsive force and a lifting force for contactless propulsion are provided in a single mechanism.

The present invention more particularly relates to a multiphase translation system including an LSRM, having a stator and a translator configured, positioned, and proportioned for electromagnetic engagement with each other, said system comprising (a) means for selectable application of at least one phase of a DC multi-phase excitation to said LSRM to thereby produce a longitudinal propulsive force between said stator and said translator; and (b) means for substantially simultaneous application of at least two phases of said DC multi-phase excitation to said LSRM to thereby produce a selectable continual force between said stator and translator. In the instant invention, there are provided means for independent control of each of said excitations of said stator and translator.

There is optionally provided a second LSRM which is in electromagnetic engagement with said LSRM, having means for multi-phase excitation of a stator and translator thereof, to thereby produce a guidance force for the system, using error values algorithmically derived from the guidance force and its command values of each phase of said first LSRM. There may be further provided means for independent control of said guidance force, relative to control of said longitudinal and normal forces of the first LSRM.

It is accordingly an object of the invention to provide a system for control, implementation and generation of lift, propulsion, and guidance forces in a LSRM translation machine without use of levitation and guidance magnets.

It is another object to provide a system of the above type in which the propulsion, lift, and guidance forces of the LSRMs may be controlled independently of each other.

A further object of the invention is the provision of a control method for LSRM's in transportation systems to enable provision of a smoother ride to passengers, this including dynamic control of guidance forces with a minimum time delay in the event of an impact of environmental or other external forces upon the transportation vehicle.

It is a yet further object to provide a translation system of the above type in which all propulsion and lift forces are produced from all windings of a multiphasic LSRM.

It is a yet further object of the invention to provide a control method for an LSRM translation system which permits reduction of the level of current in the windings thereof by utilization of guidance forces produced by propulsion-producing windings, use of propulsion forces produced by windings otherwise used to produce guidance forces, thereby utilizing all windings for purposes of propulsion and guidance.

It is a still further object to provide a system of the above type inclusive of a control system which eliminates the use of independent lift and guidance magnets, their power conversion, and associated control systems to thereby achieve lower cost, lower weight of the system and, resultingly, a significant improvement in the efficiency thereof.

It is a still further object to provide a system of the above type which will reduce the size of the system and number of constitute parts thereof, inclusive of magnetic and electronic parts.

It is a yet further object of the invention to provide a system of the above type which includes a control system for the implementation of forces of propulsion, lift, and guidance and the control thereof independently of each other, while utilizing a minimum of two sets of LSRMs.

It is another object to provide a system of the above type in which at least one LSRM thereof consists of an active translator element and a passive stator element.

The above and yet other objects and advantages of the present invention will become apparent from the hereinafter set forth Brief Description of the Drawings, Detailed Description of the Invention and Claims appended herewith

DETAILED DESCRIPTION OF THE INVENTION

Figure 1:
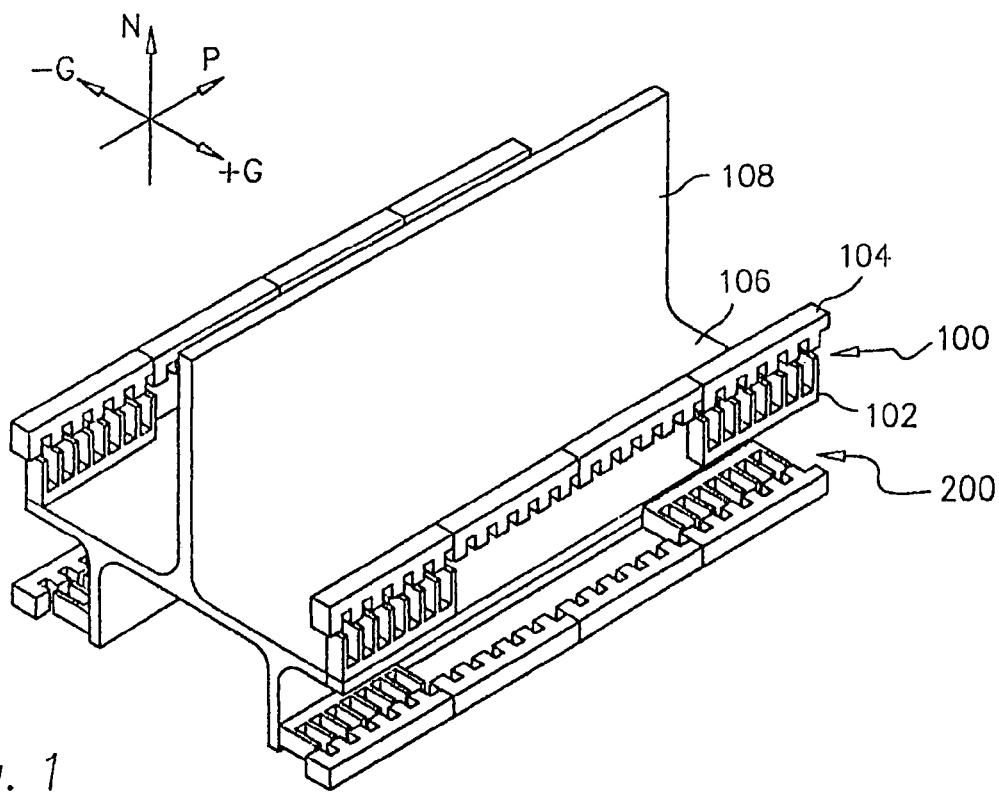
FIG. 1 is a perspective view of one embodiment of a translation system in accordance with the present invention, in which the multi-phasic windings thereof are not shown.

With regard to the perspective view of FIG. 1, there is shown an embodiment of an LSRM translation system in accordance with the invention, the same including a first LSRM 100 and an optional second LSRM 200 disposed transversely, that is, in quadrature, therewith. Either LSRM may be either longitudinal or transverse flux based. The optional second LSRM is more fully described below.

As may be further noted, first LSRM 100 includes a translator 102, more fully described below, and a stator 104, as is also more fully set forth below. Therein, the translator is formed integrally with a center member 106 of a spine member 108 of a vehicle or other object to be translated.

Figure 2:
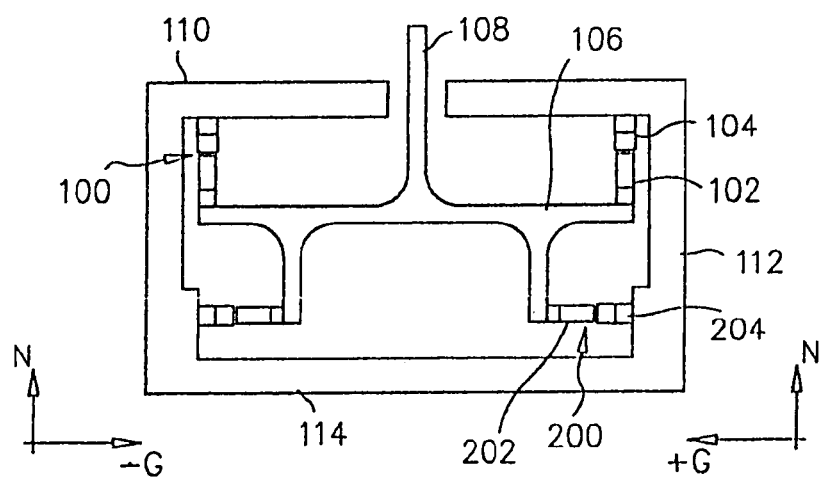
FIG. 2 is a transverse cross-sectional view of the embodiment of FIG. 1.

The above is further shown in the radial cross-sectional view of FIG. 2 in which a system support structure 110 inclusive of integral side members 112 and track members 114 are also shown.

Figure 3:
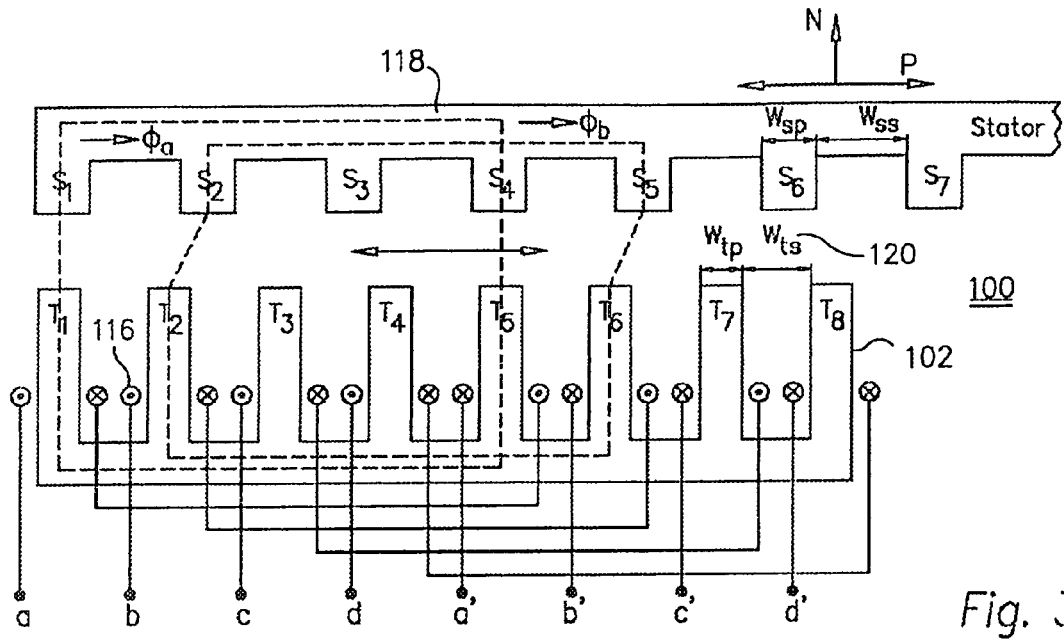
FIG. 3 is a schematic view of a four-phase longitudinal LSRM with an active translator and passive stator, in accordance with the invention.

In the schematic view of FIG. 3 is shown first LSRM 100 inclusive of said translator 102 and stator 104, the translator including polyphase windings 116. Shown in dotted lines therein is a magnetic circuit 118 produced upon direct current (DC) excitation of windings a, b, c and d, and the reiterative series thereof a', b', c' and d'. The directionality of current flow is shown by the dot and x symbols in the plane of view of FIG. 3, taken through windings 116. As may be noted, there is disclosed an active stator having eight poles and having windings of four phases, although it is understood that the invention is not limited to any particular number of phases or number of poles and that, in a given embodiment, the stator may be active and the translator passive.

The normal (also referred to as the lift or levitation) force N is shown within air gap 118 which is perpendicular to the longitudinal or propulsive force P.

Figure 4A:
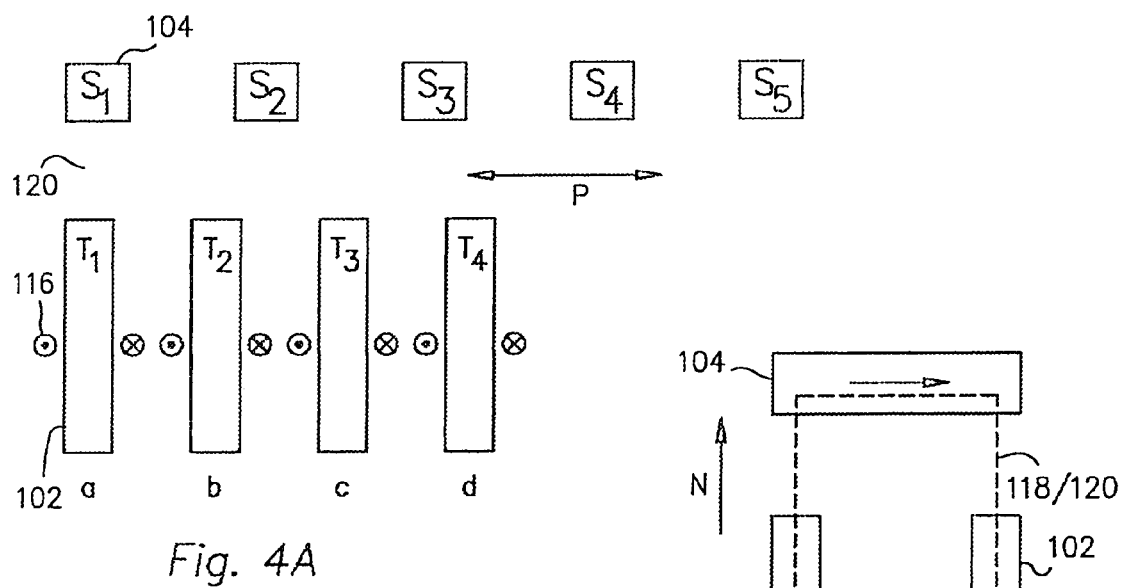
FIG. 4A is a side view of the LSRM showing the transverse flux thereof.
Figure 4B:
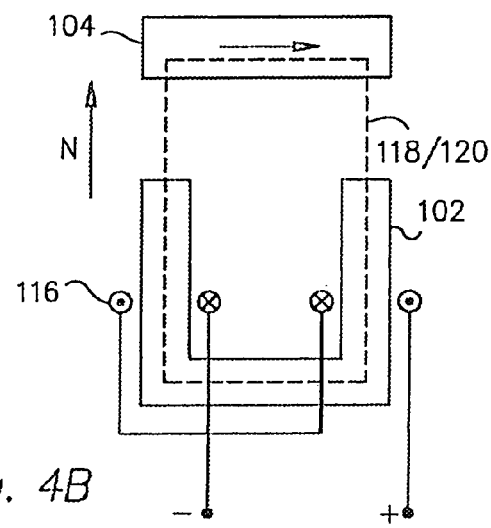
FIG. 4B is a front view of FIG. 4A.

FIG. 4A shows the transverse flux of the LSRM in side view, and in front view in FIG. 4B. The direction of the flux in this machine is transverse to the longitudinal flux direction of the LSRM shown in FIG. 3. However, regardless of the flux direction, the longitudinal and transverse flux LSRMs product longitudinal propulsive forces and normal forces that are perpendicular to each other.

Figure 5:
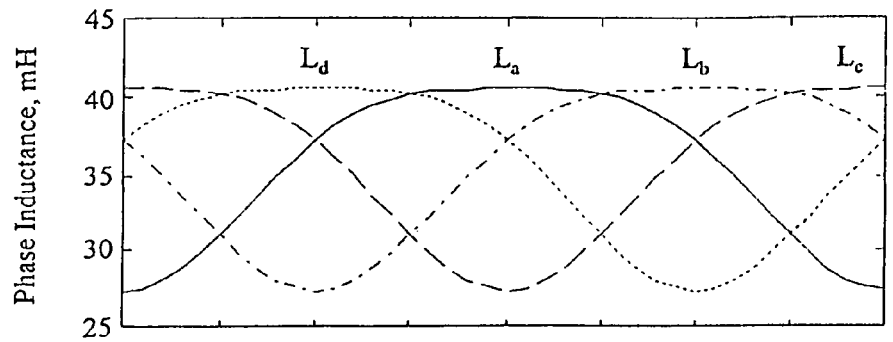
FIG. 5 is graph showing phase inductance, for each phase, as a function of translator position.
Figure 6:
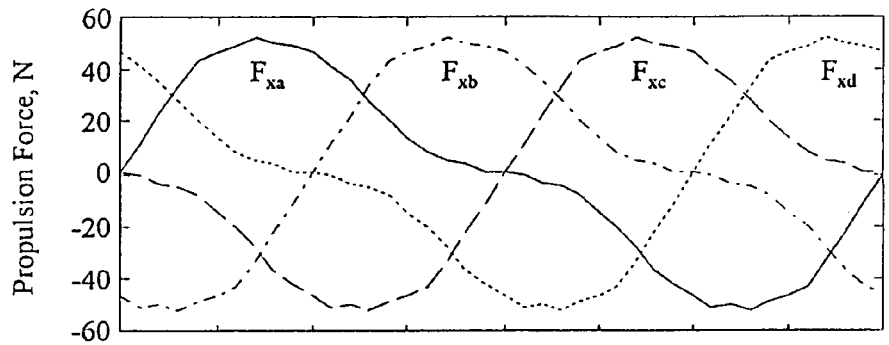
FIG. 6 is a graph showing propulsion forces, for each phase, as a function of translator position.
Figure 7:
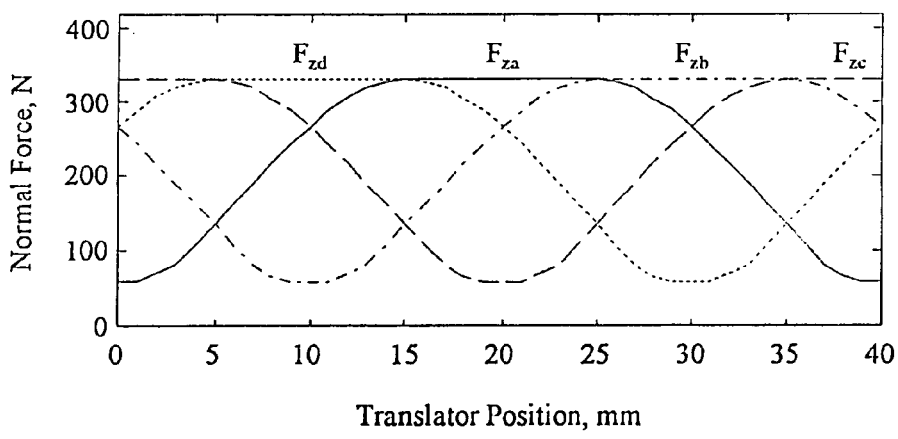
FIG. 7 is a graph showing normal forces between the stator and translator, as a function of translator position.

It may, accordingly, be appreciated that the method of the present invention is to use simultaneous multiphase (more than one phase) excitation of the LSRM 100. A phase B of said LSRM having for example, a 8/6 stator and translator pole combination, shown in FIG. 3 for longitudinal force with a longitudinal flux direction or, for longitudinal force with a transverse flux direction (see FIGS. 4A, 4B), four phases may be switched to produce the propulsion force P. The inductance verses translator position for a fixed current in the windings is shown for all the four phases and indicated by phases A, B, C and D in FIG. 5. The propulsion forces ($F_{xa}$, $F_{xb}$, $F_{xc}$, $F_{xd}$) and normal forces ($F_{za}$, $F_{zb}$, $F_{zc}$, $F_{zd}$) due to individual phase excitations are shown in FIGS. 6–7.

Phase B carries a current and generates the propulsion force $F_{xb}$, and normal force $F_{zb}$. If the vehicle requires a lift force greater than the normal force produced by phase B, then it is, in the prior art, usual to supplement it with a lift force from a separate set of levitation magnets, which adds to the cost and complexity of control. In lieu thereof, one may excite a phase A to provide a normal force which is fairly constant and at its maximum during the phase B excitation. Then, this normal force can be combined with the normal force of phase B to meet the lift force required for the vehicle. Similarly guidance forces can be generated without independent guidance magnets required in using another LSRM, for example, in the integrated levitation, guidance and propulsion system shown in said PCT Application No. US01/15208.

Control Technique

Dynamic control of the levitation and guidance forces is important to provide riding comfort and control of the vehicle particularly during environmental force disturbances. To control such forces generation, phase B is energized. It produces almost the entire propulsion force P and some of the normal (lift) force N. If one then excites phase A, its contribution to force P is small or negligible and force N is maximum. Therefore, one can use the phase B for garnering the force P for the system and force from a combination the forces of the phases A and B. Even the force of phase D may contribute to this combination.

One then subtracts the normal force of the phase B from the total lift forces N required for the vehicle. The remainder then is generated by a phase A normal force. Accordingly, the phase A current is adjusted to provide the remainder of the lift forces. See FIG. 7. This strategy has the advantage that even at zero propulsion force, i.e., at phase B current of zero, the normal force required to lift the vehicle is provided by phase A. That is, the lift force N exists even at standstill of the vehicle. This is an important operating point of the system.

Figure 8:
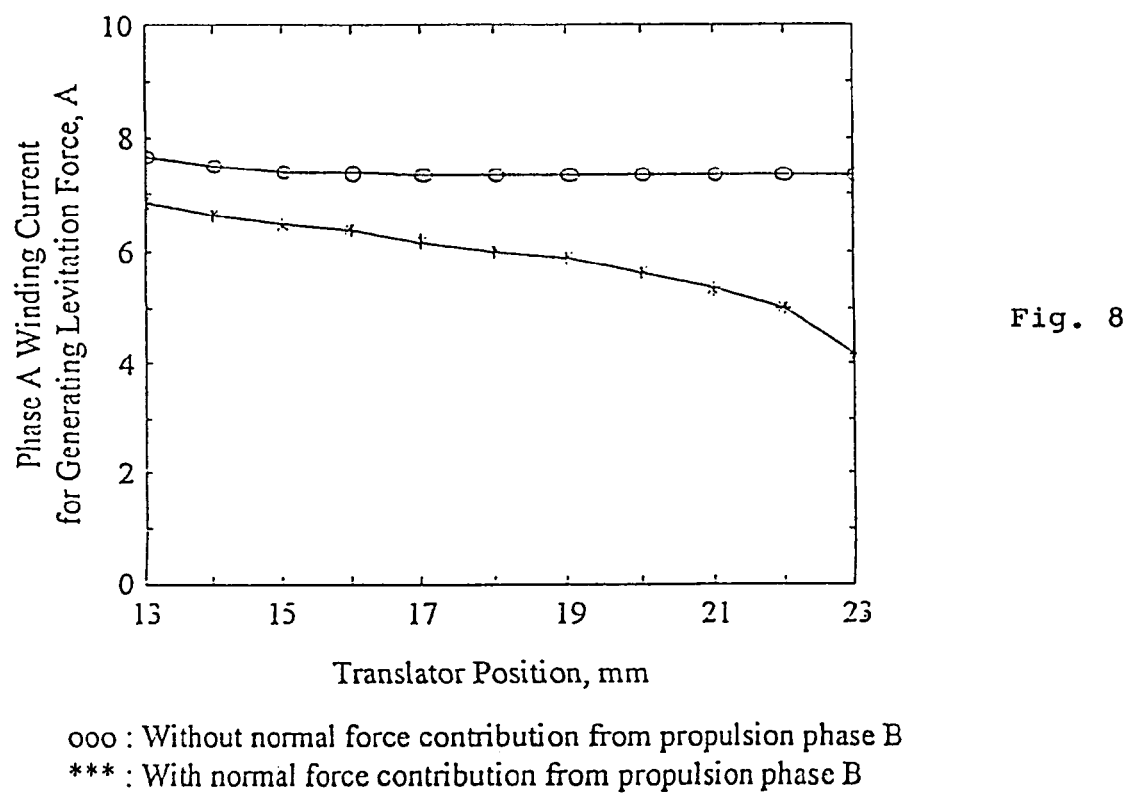
FIG. 8 is a graph showing phase A winding current for the generation of lift force as a function of translator position, showing reduction in Phase A current with and without use of the normal force produced by Phase B.

Because of the normal force of the propulsion windings 106, in this case phase B is utilized, so that the total normal force requirement upon the other phase(s), in this case phase A decreases, resulting in a reduction of phase A current and hence in an increase in the overall efficiency of the system. Such an improvement in system performance is shown in FIG. 8.

Control Implementation

Figure 9:
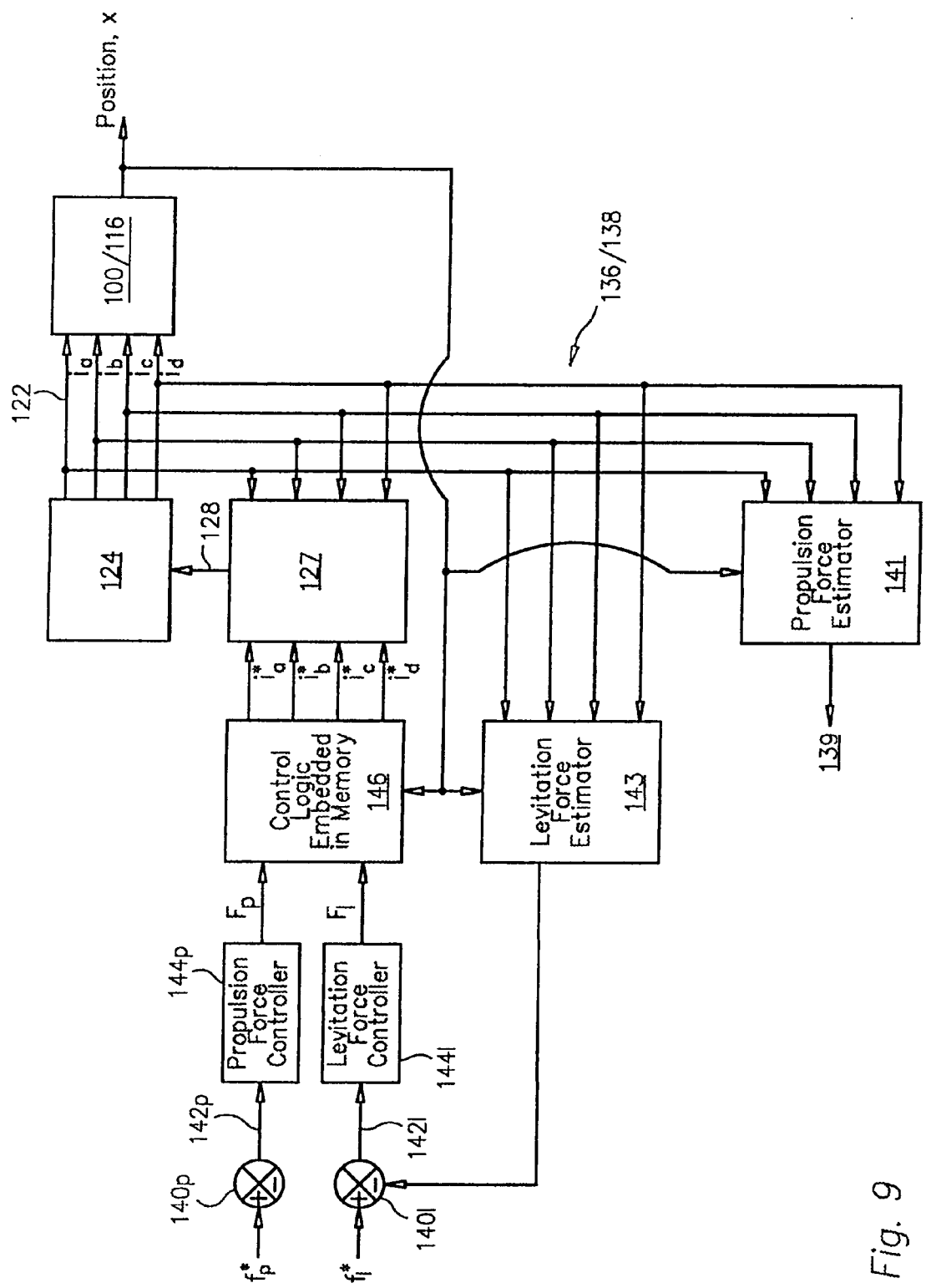
FIG. 9 is a schematic block diagram view of a control system in accordance with one embodiment of the present invention.

An implementation of the control strategy is shown in FIG. 9 and is described as follows:

The translator 102 has eight $T_1$ to $T_8$ poles and four phase windings 116 with said passive stator 104. The position of the translator poles with respect to stator poles is measured either using a linear encoder or a magnetic pick-up, both of which measure the absolute position of the translator. It may also be estimated using the currents in the windings or a combination of applied currents and voltages in the windings. The manner in which the position is obtained does not alter the present invention. In addition, the phase currents are measured using a Hall effect current sensor, and then, are conditioned and scaled for use in the control circuits, described below. Thereby, five feedback signals, i.e., translator absolute position, and four phase currents, are required for control of the system. These feedback signals can be measured or estimated, and in the manner in which they are obtained does not alter the operation of the system using the invention.

Figure 10:
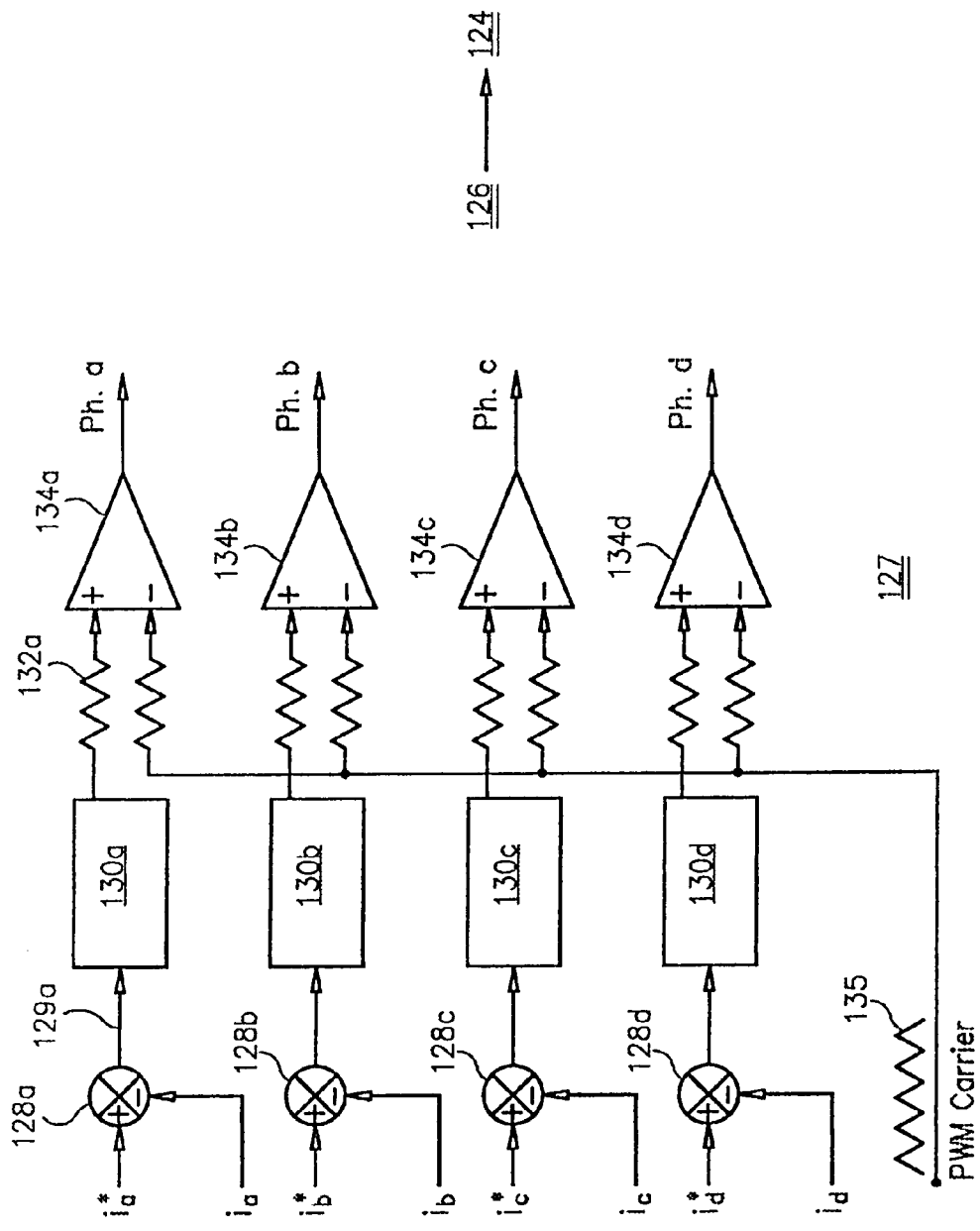
FIG. 10 is a block diagram schematic of the current control circuit of the inventive system.

Inputs 122 to the translator windings 116 are applied voltages from a power converter 124 that has two power switching devices and two diodes per phase, or any other kind of power converter capable of supplying the translator with variable voltage and variable direct current. The power converter 124 receives the gate signals 126 provided by a current control circuit (CCC) 127 which signals are isolated, amplified and fed to the gates of the appropriate power switching devices. See FIG. 9. The inputs to the CCC 127 are the phase currents i and their command values indicated by an asterisk for the respective currents. The CCC in detail is shown in FIG. 10. Its function for only phase A is described in the following. The gate signal generation for other phases is identical to that of phase A and therefore is omitted for brevity.

The feedback current for phase A ($i_a$) is subtracted from its command current ($i^*_a$) using a summing block 128a. The result is a current error 129a for phase A. This current error is amplified through a proportional plus integral (PI) current controller 130a. The same may be substituted for by a proportional plus integral plus derivative controller, a neural network controller, or a fuzzy controller or a combination thereof. Output 132a thereof is passed through a limiter to ensure the control signal stays within bounds of safe operation of the control and converter circuits. See FIG. 10. The output 132a of the PI controller 130a is a control signal which is compared to a triangular high frequency carrier waveform 135 known as pulse width modulation (PWM) signal with an operational amplifier/comparator 134a. The entire CCC 127 can also be implemented in software and/or in a micro controller. However, the manner of implementation does not alter the basic functionality described herein.

The carrier frequency may be adjustable depending on the speed of operation or can be kept constant. The output of the comparator is the gate signals 126 for the respective phases of the converter 124. See FIGS. 9 and 10. Further processing may be required depending on the type of converter and the switching strategy chosen to satisfy certain performance criteria. This however does not alter the fundamental invention.

Figure 11:
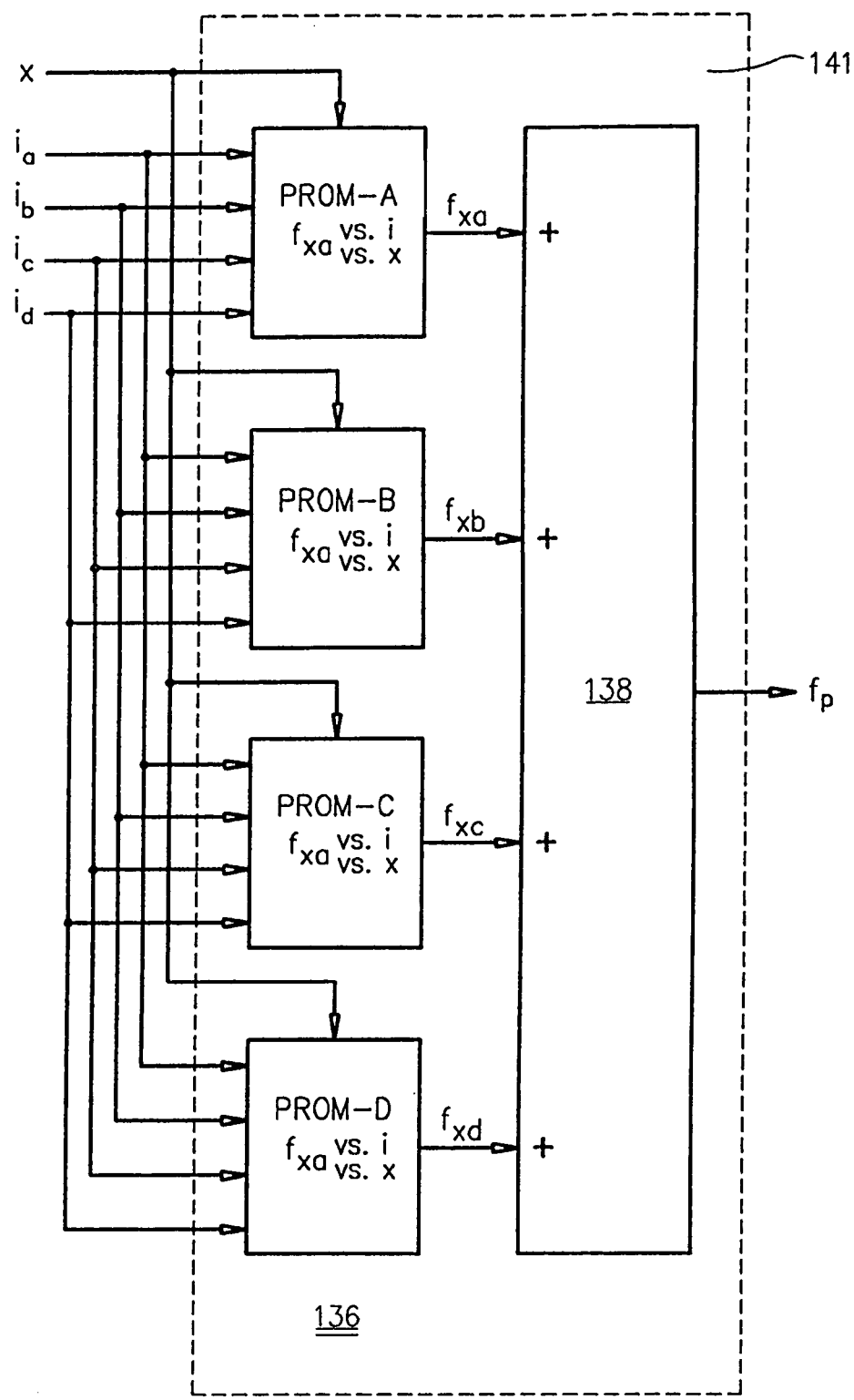
FIG. 11 is a schematic block diagram view showing the use of PROMs for the estimating and summing of propulsive forces of each phase of the multi-phase excitations to the LSRM.

Four phase current commands are generated as follows. The required propulsion and levitation forces are converted into signal commands as $f^*_p$ and $f^*_l$, respectively. See left side of FIG. 9. To ensure that these command forces are generated by the LSRM 100, the actual propulsion and levitation forces $f^*_p$ and $f^*_l$ produced by the LSRM are estimated. The estimation of these forces is achieved by an algorithm that may be stored in the form of discrete data stored in a memory. In the propulsion force estimation, the phase currents i and the translator position x are inputs to PROMS 136 or any equivalent device such as an electrically programmable read only memory (EPROM) or an electrically erasable programmable read only memory (EEPROM) or any other static programming memory device such as a static random access memory (SRAM). The propulsion force has a three dimensional relationship to translator position and phase current. This relationship is stored in said PROMs 136 with phase current and translator position as inputs and loaded into an address memory, with the propulsion force $f_p$ comprising the sum of the memories of said PROMS. See FIG. 11. Four of a said PROMs 136 (PROM-A, PROM-B, PROM-C, PROM-D) are required to store the relationship between the phase current and translator position, and the resulting propulsion force. For a given input phase current and translator position, the propulsion force can be extracted from this stored three-dimensional relationship. As above noted, the total propulsion force $f_p$ generated in the LSRM 100 is estimated by summing the individual propulsion force contributions of each phase, as is noted by block 138 in FIG. 11. This can also be effected in hardware or in software with a micro-controller. Said contributions are also inputs to a subsystem 141 which estimates propulsion force 139 or $f_p$ as a function of current and translator position. See FIGS. 9 and 11.

Similarly, the levitation force can be estimated since the levitation force of a phase is a function of translator position and phase current. Such a three-dimensional relationship of the levitation force can be captured in a subsystem 143 in a manner similar to the three-dimensional relationship described above per said subsystem 141. That is, from the phase current and translator position inputs, the levitation forces of individual phases can be estimated by subsystem 143, their sum leading to the total levitation force $f_l$, produced by the LSRM.

The estimated propulsion force $f_p$ then is subtracted from the desired or commanded propulsion force $f^*_p$, as noted in function 140$p$, and the result is an error value 142$p$ in the propulsion force which is amplified and limited with a proportional and integral controller 144$p$. The resulting output signal is the final propulsion control signal $F_p$. The propulsion force command is developed from a control error between the velocity command and actual velocity or the translator. This control error can be amplified, conditioned and compensated to provide the final propulsion force command. Usually, said proportional plus integral controller is sufficient for this purpose.

The estimated levitation force $f_l$ is subtracted from the desired or commanded levitation force $f^*_l$, and the result is an error value 142$l$ in the levitation force which is amplified and limited with a proportional and integral controller 144$l$. The resulting output signal is the final levitation control signal $F_l$. See FIG. 9. The levitation force command is developed from a control error between the required air gap 120 between the translator and stator and the measured or estimated air gap between the translator and stator. This control error can be amplified, conditioned and compensated to provide the final levitation force command. Usually, a proportional plus integral plus derivative controller is sufficient for this purpose.

The final propulsion and levitation control signals, $F_p$ and $F_l$, respectively, together with the translator absolute position, generate the current commands. Logic 146 generates current commands I*. This is explained and derived for one case as follows:

With reference to FIGS. 6–7, if the translator position is 10 mm, at that point, phase B is well suited to produce the propulsion force and phases A and D for levitation force production. The current required in phase B for propulsion force is extracted from a three dimensional relationship of the translator absolute position, phase current and propulsion force (similar to that of the estimation technique described above and stored in a PROM) by giving the final propulsion force and the translator position. The levitation force of phase B is subtracted from the levitation force requirement, and the remaining force is then produced by either phase A or D depending on which also produces the minimum of propulsion force. Accordingly, phase A or phase D is chosen and from the three dimensional relationship of the levitation force, translator position and current, the phase current command for phase A or phase D is extracted. Alternately, both phases A and D can be energized to share the levitation forces, thereby reducing the current in each of these phases and making it possible to achieve a high dynamic bandwidth in the control of levitation forces. These control algorithms are likewise derived for one full translator pitch and can be repeated for each translator pitch to include for both directions of movement of the translator. These control algorithms may be realized using hardware or software with a micro-controller.

Similarly, the control method and implementation described for control of propulsion force P and levitation force N is applicable to control of guidance forces G (together with the propulsion force P) by a second LSRM 200 placed in quadrature (perpendicular) position to said first LSRM set 100 that produces levitation and propulsion forces. See FIGS. 1 and 2. Therein, spline 108 effects vehicle support so that center member 106 is a moving surface. Stator 104 is the propulsion and levitation rail, while translator 102 is the propulsion and levitation actuator. With regard to second LSRM 200, FIGS. 1 and 2 also show propulsion and a guidance actuator 202, and propulsion and guidance rail 204. Thereby the guidance forces +G and −G may be provided for the first LSRM 100 and the propulsive force P thereof is supplemented by that of said second LSRM. In order for the normal forces and guidance forces to provide stability to a vehicle or a load, it is desirable to have independent control of the LSRMs in each set. This allows for the flexibility in assigning required normal and guidance forces dynamically on each side (both top and bottom) of the load or vehicle.

With an active stator and a passive translator LSRM carrying a vehicle with the translator under the stator, as in a set 1, and translator placed sideways to the stator, as in a set 2, the propulsion and levitation forces can be generated and controlled independently of one another with a minimum of one set LSRM where one set means one active stator and one passive translator With a minimum of two sets of LSRMs placed perpendicular to said set 1 with active stators and passive translator configuration, the propulsion and guidance forces can be generated and controlled independently of one another where one set LSRM consists of one active stator and one passive translator.

A guidance force command may be derived from the control error between the required air gap between the translator and stator (of set 2) and the measured or estimated air gap between said translator and stator. This control error can then be amplified, conditioned and compensated to provide the final guidance force command. Usually, a proportional plus integral plus derivative controller is sufficient in such applications. It is noted that the system of said second LSRM includes a power converter, a current control circuit and a separate propulsion and guidance control system, similar to that described above relative to FIG. 9.

The total propulsion force requirement of the vehicle may be shared equally between the first and second LSRM sets. For part load operation of the vehicle, propulsion force generation need not be equally shared between the first and second sets of LSRMs. For example, if the propulsive force requirement of the system is 50% of the total, then one set alone can produce that, i.e., said first LSRM. Therein, the second LSRM set is operated only to generate the guidance forces. If the levitation force is entirely supplied by the first LSRM set, the guidance force is entirely supplied by the second LSRM set.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A multi-phase translation system, comprising:
   (a) a first linear switched reluctance machine (LSRM) having a stator and a translator configured, positioned and proportioned for electromagnetic, substantially non-mutually inductive, engagement with each other;
   (b) means for selectable application of at least one phase of a multi-phase DC excitation to said LSRM, to produce a longitudinal propulsive force between said stator and said translator;
   (c) means for substantially simultaneous application of at least two phases of said multi-phase excitation to said LSRM to produce a selectable value of said normal force between said stator and translator;
   (d) means for independent control of said DC excitation of said application means (b) and of said multi-phase excitation of said application means (c) above;
   (e) means for measurement of an absolute position of said translator relative to said stator;
   (f) means for measurement of currents associated with each phase of said multi-phase excitation;
   (g) means for establishing command values for currents associated with each phase of said multi-phase excitation producing said longitudinal force;
   (h) means for comparison of said currents to respective command values thereof to produce error values for each comparison;
   (i) means for monitoring said error values;
   (j) means for applying said error values to a carrier signal; and
   (k) means for applying said error values of said signal to respective phases of said excitation current of said LSRM.

2. The system as recited in claim 1 in which said translator comprises:
   eight poles and windings of four phases.

3. The system as recited in claim 1, further comprising:
   (k) a plurality of PROMS for continual storage of dynamic values of translator position and each phase current associated therewith;
   (l) for each PROM, means for storage of propulsive force values as a function of each of said dynamic values stored in each PROM; and
   (m) means for summing said propulsive forces.

4. The system as recited in claim 3, further comprising:
   (n) for each PROM, means for storage of levitation force values associated with said normal force; and
   (o) means for summing said levitation forces.

5. The system as recited in claim 4, further comprising:
   means for establishing command values for currents associated with each phase of said multi-phase excitation producing said longitudinal force;
   means for comparison of said currents to respective command values thereof to produce error values for each comparison; and
   means for monitoring said error values.

6. The system as recited in claim 1 further comprising:
   means for dynamically compensating for said error values that are out-of-limit.

7. The system as recited in claim 1, further comprising:
   means for dynamically compensating for said error values that are out-of-limit.

8. The system as recited in claim 1 further comprising:
   a second LSRM, said LSRM in electromagnetic engagement with said first LSRM, having means for DC multi-phase excitation of a stator and translator thereof, to thereby produce a guidance force for said system using said error values of said second LSRM.

9. The system as recited in claim 8 in which said second LSRM is in quadrature with said first LSRM.

10. The system as recited in claim 9, further comprising:
    means for dynamically compensating for said error values that are out-of-limit.

11. The system as recited in claim 10, further comprising:
    means for independent control of said guidance force of said second LSRM.

12. The system as recited in claim 1, in which said translation system comprises:
    a part of any of a transportation system, an elevator, a rocket launcher, an aircraft launcher, a rail gun, a conveyor, a door opener, a machine tool, or a servo-drive.

13. The system as recited in claim 12, further comprising:
    a second LSRM, said LSRM in electromagnetic engagement with said first LSRM, having means for DC multi-phase excitation of a stator and translator thereof, to thereby produce a guidance force for said system using said error values of second LSRM.

14. The system as recited in claim 13, in which either of said LSRM comprises a longitudinal or transverse flux type machine.

* * * * *